(12) United States Patent
Huang

(10) Patent No.: US 9,234,537 B2
(45) Date of Patent: Jan. 12, 2016

(54) AUTOMATICALLY EXTENSIBLE TELESCOPIC APPARATUS

(71) Applicant: Han-Ching Huang, Taichung (TW)

(72) Inventor: Han-Ching Huang, Taichung (TW)

( * ) Notice: Subject to any disclaimer, the term of this patent is extended or adjusted under 35 U.S.C. 154(b) by 579 days.

(21) Appl. No.: 13/674,059

(22) Filed: Nov. 11, 2012

(65) Prior Publication Data

US 2014/0133899 A1    May 15, 2014

(51) Int. Cl.

| | |
|---|---|
| *F16B 7/00* | (2006.01) |
| *F16B 7/14* | (2006.01) |
| *E04G 25/06* | (2006.01) |
| *F16B 7/10* | (2006.01) |
| *E04G 25/04* | (2006.01) |

(52) U.S. Cl.
CPC .............. *F16B 7/1454* (2013.01); *E04G 25/06* (2013.01); *F16B 7/105* (2013.01); *E04G 2025/045* (2013.01); *Y10T 403/32475* (2015.01)

(58) Field of Classification Search
CPC ....................................................... B60P 7/15
See application file for complete search history.

(56) References Cited

U.S. PATENT DOCUMENTS

| | | | | |
|---|---|---|---|---|
| 5,662,429 A | * | 9/1997 | Battocchio | 403/377 |
| 5,833,414 A | * | 11/1998 | Feldman et al. | 410/151 |
| 5,947,666 A | * | 9/1999 | Huang | 410/151 |
| 6,782,903 B1 | * | 8/2004 | Jarman et al. | 135/75 |
| 7,025,522 B2 | * | 4/2006 | Sicz et al. | 403/109.2 |
| 7,374,380 B2 | * | 5/2008 | Huang | 410/151 |
| 2007/0151195 A1 | * | 7/2007 | Huang | 52/651.07 |

\* cited by examiner

*Primary Examiner* — Victor Macarthur

(57) ABSTRACT

An automatically extensible telescopic apparatus includes a first tube inserted in a second tube. A positioning unit includes a ferrule, two fins, a shaft, a toothed wheel and a first detent. The ferrule is provided on the second tube. The fins extend from the ferrule. The shaft is supported on the fins. The toothed wheel is supported on the shaft and includes teeth for insertion in recesses defined in the first tube. The first detent is supported on the fins for engagement with the toothed wheel. A handle includes two blades and a second detent. The blades are placed between the fins and supported on the shaft. The second detent is supported on the blades for engagement with the toothed wheel. An elastic element compressed between the first and second tubes for extending the first tube from the second tube.

10 Claims, 10 Drawing Sheets

AUTOMATICALLY EXTENSIBLE TELESCOPIC APPARATUS

BACKGROUND OF INVENTION

1. Field of Invention

The present invention relates to a telescopic apparatus and, more particularly, to an automatically extensible telescopic apparatus.

2. Related Prior Art

A conventional telescopic apparatus includes a tube inserted in another tube, a positioning unit operable for moving and positioning the tubes relative to each other, and two contact units each connected to a respective one of the tubes. The conventional telescopic apparatus is extensible by operating the positioning unit or pulling the tubes from each other. Either way, the extension of the conventional telescopic apparatus is manual.

There has been a hydraulically extensible telescopic apparatus using hydraulic pressure to extend the tubes from each other. The hydraulically extensible telescopic apparatus is however expensive.

The present invention is therefore intended to obviate or at least alleviate the problems encountered in prior art.

SUMMARY OF INVENTION

It is the primary objective of the present invention to provide an inexpensive automatically extensible telescopic apparatus.

To achieve the foregoing objective, the telescopic apparatus includes two tubes, a positioning unit, a handle, and an elastic element. The first tube is inserted in the second tube. The positioning unit includes a ferrule, two fins, a shaft, a toothed wheel and a first detent. The ferrule is provided on the second tube. The fins extend from the ferrule. The shaft is supported on the fins. The toothed wheel is supported on the shaft and includes teeth for insertion in recesses defined in the first tube. The first detent is supported on the fins for engagement with the toothed wheel. The handle includes two blades placed between the fins and supported on the shaft. A second detent is supported on the blades for engagement with the toothed wheel. The elastic element is compressed between the first and second tubes for extending the first tube from the second tube.

In another aspect, the automatically extensible telescopic apparatus further includes a third tube and an elastic lock. The second tube is inserted in the third tube. The second tube includes an aperture defined therein. The third tube includes several apertures defined therein. The elastic lock includes a boss extending from a leaf spring. The leaf spring is placed in the second tube while the boss can be inserted in a selected one of the apertures of the third tube via the aperture of the second tube.

In another aspect, each fin includes an edge formed with a segment formed with a first end and a second end. The second end from is placed further from the axis than the first end is. The toothed wheel cannot be rotated and the first and second tubes cannot be moved relative to each other when the second detent is placed at the first end. The toothed wheel can be rotated and the first and second tubes can be moved relative to each other when the second detent is placed at the second end.

Other objectives, advantages and features of the present invention will be apparent from the following description referring to the attached drawings.

BRIEF DESCRIPTION OF DRAWINGS

The present invention will be described via detailed illustration of three embodiments referring to the drawings wherein.

DETAILED DESCRIPTION OF EMBODIMENTS

Figure 1:
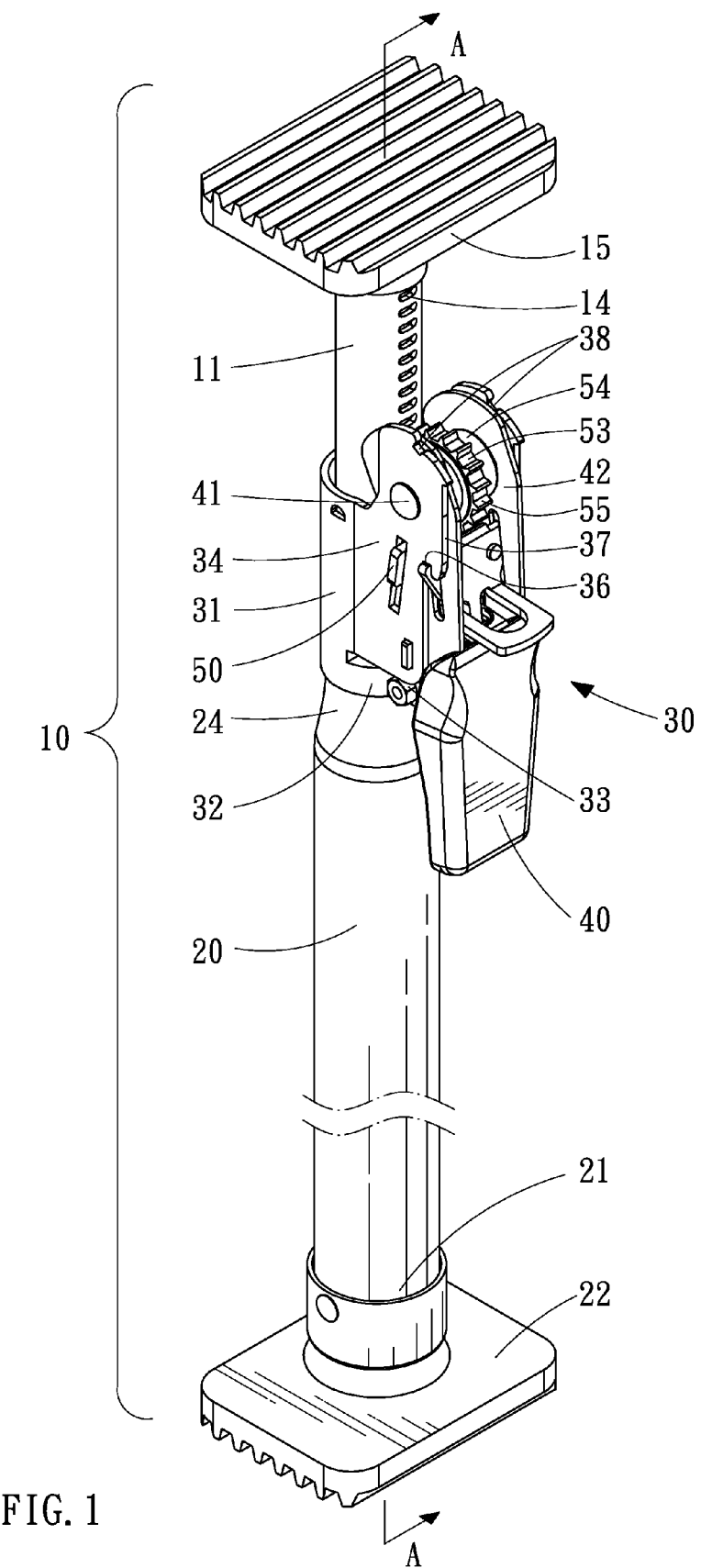
FIG. 1 is a perspective view of an automatically extensible telescopic apparatus according to the first embodiment of the present invention.

Referring to FIG. 1, an automatically extensible telescopic apparatus 10 includes a first tube 11 telescopically inserted in a second tube 20, a positioning unit 30 operable for moving and positioning the tubes 11 and 20 relative to each other, and an elastic element 25 for extending the tube from the tube 20 according to a first embodiment of the present invention.

Figure 2:
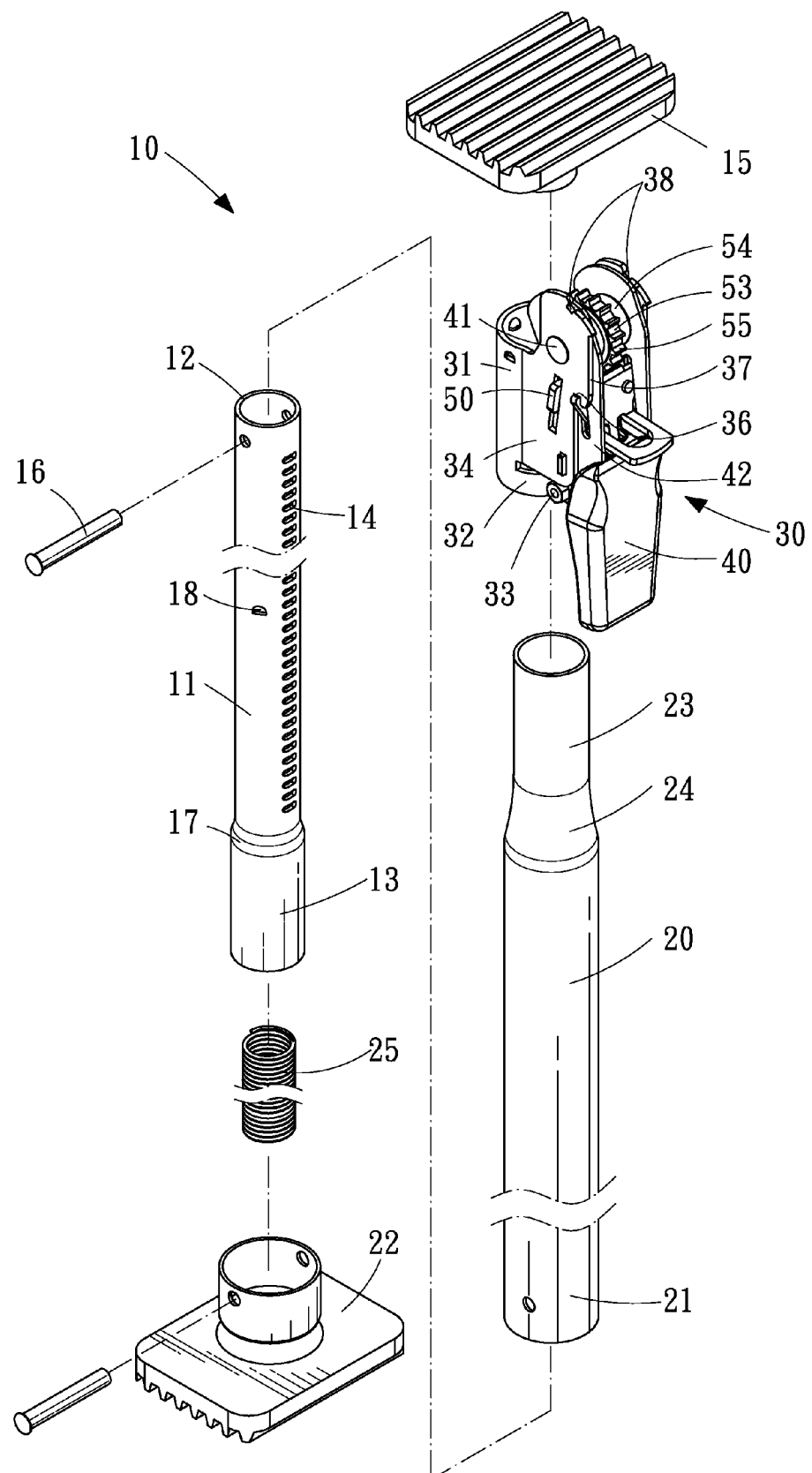
FIG. 2 is an exploded view of the automatically extensible telescopic apparatus shown in FIG. 1.

Referring to FIG. 2, the first tube 11 includes a thin section 12, a thick section 13, a transient section 17 extending from the thin section 12 to the thick section 13, recesses 14 defined in and arranged along the thin section 12, and bosses 18 extending from an internal side of the thin section 12. The recesses 14 may be grooves or slots. A contact element 15 is pivotally connected to the thin section 12 of the first tube 11 by a pin 16.

The second tube 20 includes a thin section 23, a thick section 21 and a transient section 24 extending from the thin section 23 to the thick section 21. Another contact element 22 is pivotally connected to the thick section 21 of the second tube 20 by another pin 16.

The elastic element 25 is preferably a helical spring used as a compression spring.

Figure 3:
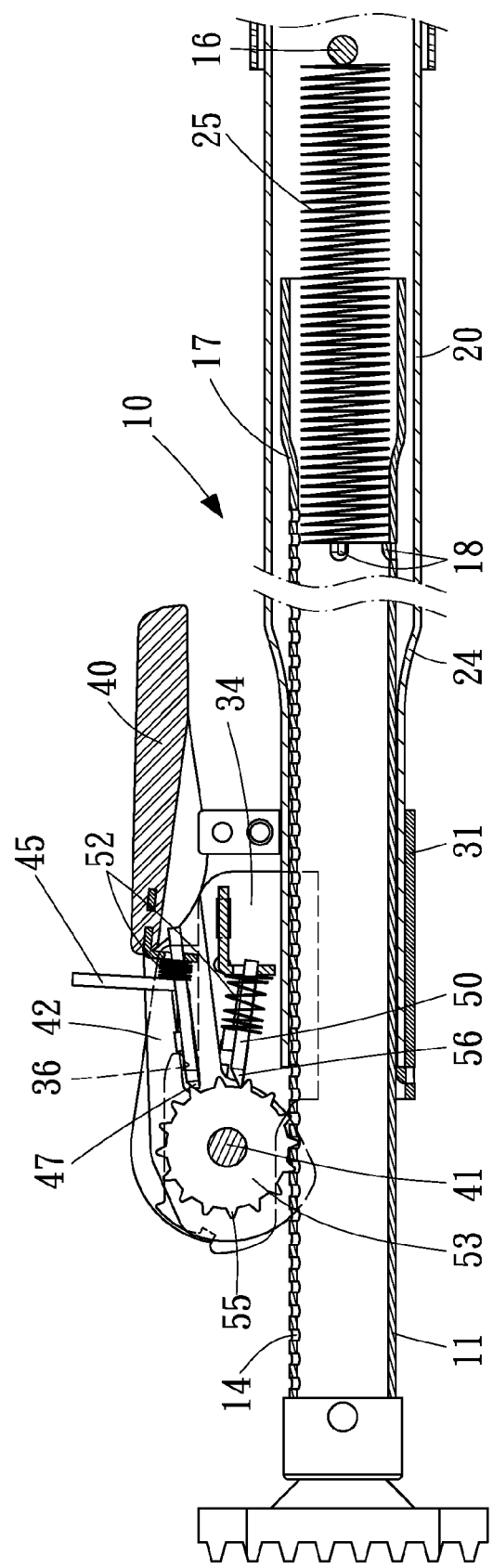
FIG. 3 is a cross-sectional view of the automatically extensible telescopic apparatus shown in FIG. 1.

Referring to FIG. 3, the positioning unit 30 includes a ferrule 31, a handle 40, a shaft 41, two detents 50 and 45, and a toothed wheel 53. The ferrule 31 includes a semi-tubular body, two tabs 32 extending from two edges of the semi-tubular body, and two fins 34 extending from the edges of the semi-tubular body. The tabs 32 are separated from the fins 34. Each fin 34 includes an edge formed with three segments 36, 37 and 38. The segments 36 and 38 are recessed segments.

The handle 40 includes two blades 42. Each blade 42 includes a cam 43 formed at an end.

The toothed wheel 53 includes a plurality of teeth 55 formed on the periphery. There are provided two spacers 54 for positioning the toothed wheel 53 axially. The spacers 54 are in the shape of a cap.

The detent 50 includes a tongue 56 extending from a front edge, two wings extending from two lateral edges, and a tail extending from a rear edge. The tongue 56 is in the form of a ratchet. There is provided a first helical spring 52 for biasing the detent 50.

The detent 45 includes a tongue 47 extending from a front edge, two wings extending from two lateral edges, and a tail extending from a rear edge. The tongue 47 is in the form of a ratchet. There is provided a second helical spring 52 for biasing the detent 45.

In assembly, the first tube 11 is inserted in the second tube 12. The thin section 12 of the first tube 11 can be extended from the thin section 23 of the second tube 20 so that at least some of the recesses 14 are placed out of the second tube 20. The transient section 17 of the first tube 11 can be placed against the transient section 24 of the second tube 20 to prevent movement of the first tube 11 out of the second tube 20 in a direction. The elastic element 25 is compressed between the bosses 18 and the pin 16 that pivotally connects the second tube 20 to the contact element 22.

The tail of the detent 50 is inserted in the first helical spring 52 and a hollow supporting element placed between and attached to the fins 34. Each wing of the detent 50 is movably inserted in a slot defined in a respective fin 34. The first helical spring 52 is hence compressed between the supporting element and the detent 50.

The tail of the detent 45 is inserted in the second helical spring 52 and a frame attached to or formed on the handle 40. Each wing of the detent 45 is movably inserted in a slot defined in a respective blade 42. Thus, the second helical spring 52 is compressed between the handle 40 and the detent 45.

The toothed wheel 53 is sandwiched between the spacers 54. The spacers 54 are placed between the cams 43. The cams 43 are placed between the fins 34. The shaft 41 is inserted in the fins 34, the cams 43, the spacers 54, and the toothed wheel 53.

The ferrule 31 is placed around the thin section 23 of the second tube 20. The tabs 32 are forced toward each other by a fastener 33 such as a screw and rivet. Thus, the positioning unit 30 is retained on the second tube 20.

Referring to FIG. 3, the automatically extensible telescopic apparatus 10 is in an idle mode as each wing of the detent 45 is placed in the segment 36 of the edge of the respective fin 34 to avoid pivoting of the handle 40. The tongue 56 is in contact with the toothed wheel 53. The tongue 56 prevents the toothed wheel 53 from counterclockwise rotation, thus avoiding insertion of the first tube 11 into the second tube 20. The tongue 56 allows the toothed wheel 53 to rotate clockwise. The tongue 56, which is biased by the springs 52, would however impede clockwise rotation of the toothed wheel 53. Hence, the first tube 11 can be extended from the second tube 20 by an external force in addition to the force loaded in the elastic element 25. The first tube 11 however cannot be extended from the second tube 20 by the force loaded in the elastic element 25 alone.

Figure 4:
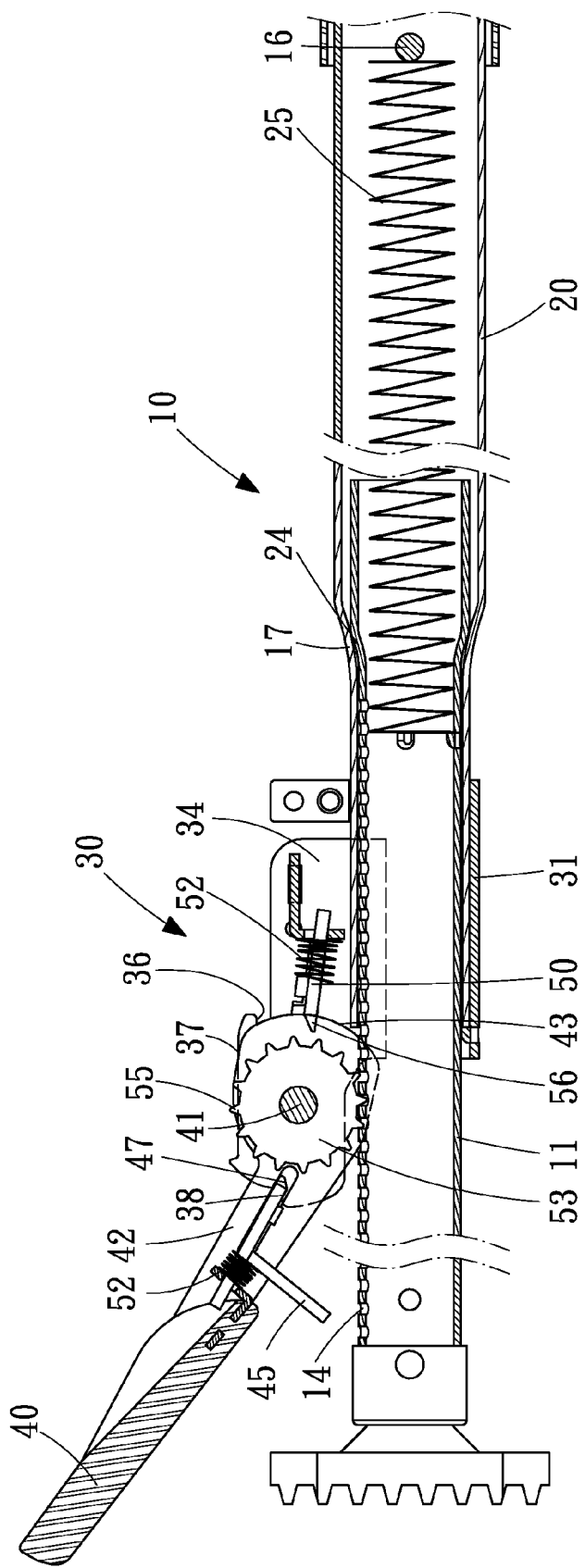
FIG. 4 is a cross-sectional view of the automatically extensible telescopic apparatus in another position than shown in FIG. 3.

Referring to FIG. 4, the automatically extensible telescopic apparatus 10 is in an automatic mode as each wing of the detent 45 is placed in the segment 38 of the edge of the respective fin 34. The tongue 47 of the second detent 40 is kept away from the toothed wheel 53 by the fins 34 while the tongue 56 of the detent 50 is kept away from the toothed wheel 53 by the cams 43. Hence, the first tube 11 can automatically be extended from the second tube 20 by the force loaded in the elastic element 25 alone. Alternatively, the first tube 11 can manually be inserted into the second tube 20.

Figure 5:
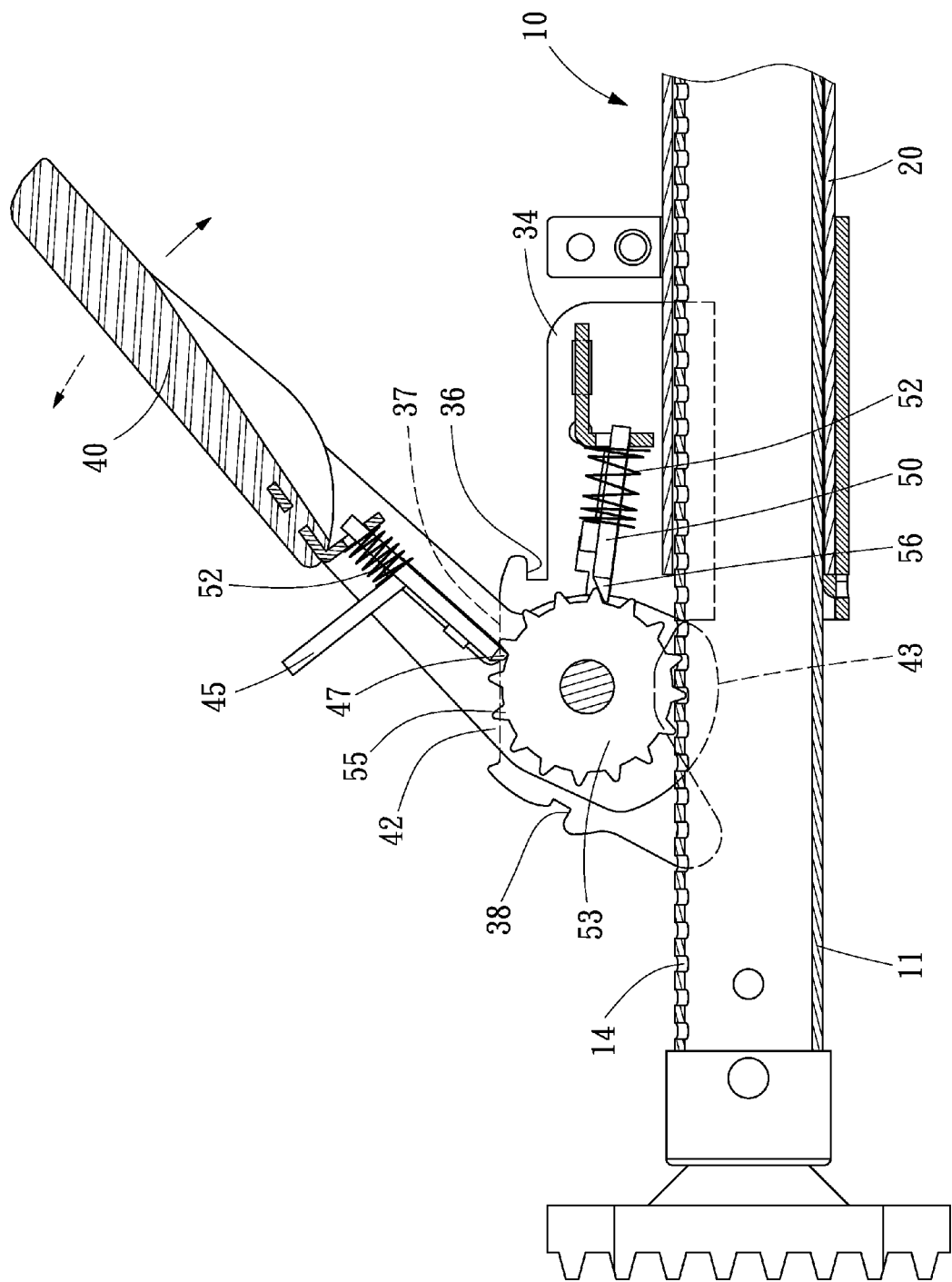
FIG. 5 is a cross-sectional view of the automatically extensible telescopic apparatus in another position than shown in FIG. 4.

Referring to FIG. 5, the automatically extensible telescopic apparatus 10 is in a manual mode as each wing of the detent 45 is placed on the segment 37 of the edge of the respective fin 34. Now, the handle 40 is allowed to pivot. The tongues 47 and 56 are both in contact with the toothed wheel 53.

The handle 40 is pivoted in an idle direction as indicated by a phantom arrow head. The tongue 47 rattles on and moves past some of the teeth 55 of the toothed wheel 53. The toothed wheel 53 is not rotated so that the first tube 11 is not further inserted into the second tube 20.

Then, the handle 40 is pivoted in an active direction as indicated by a solid arrow head. One of the teeth 55 of the toothed wheel 53 is engaged with the tongue 47. Thus, the toothed wheel 53 is rotated by the handle 40 via the second detent 45. Accordingly, the first tube 11 is extended from the second tube 20.

Figure 6:
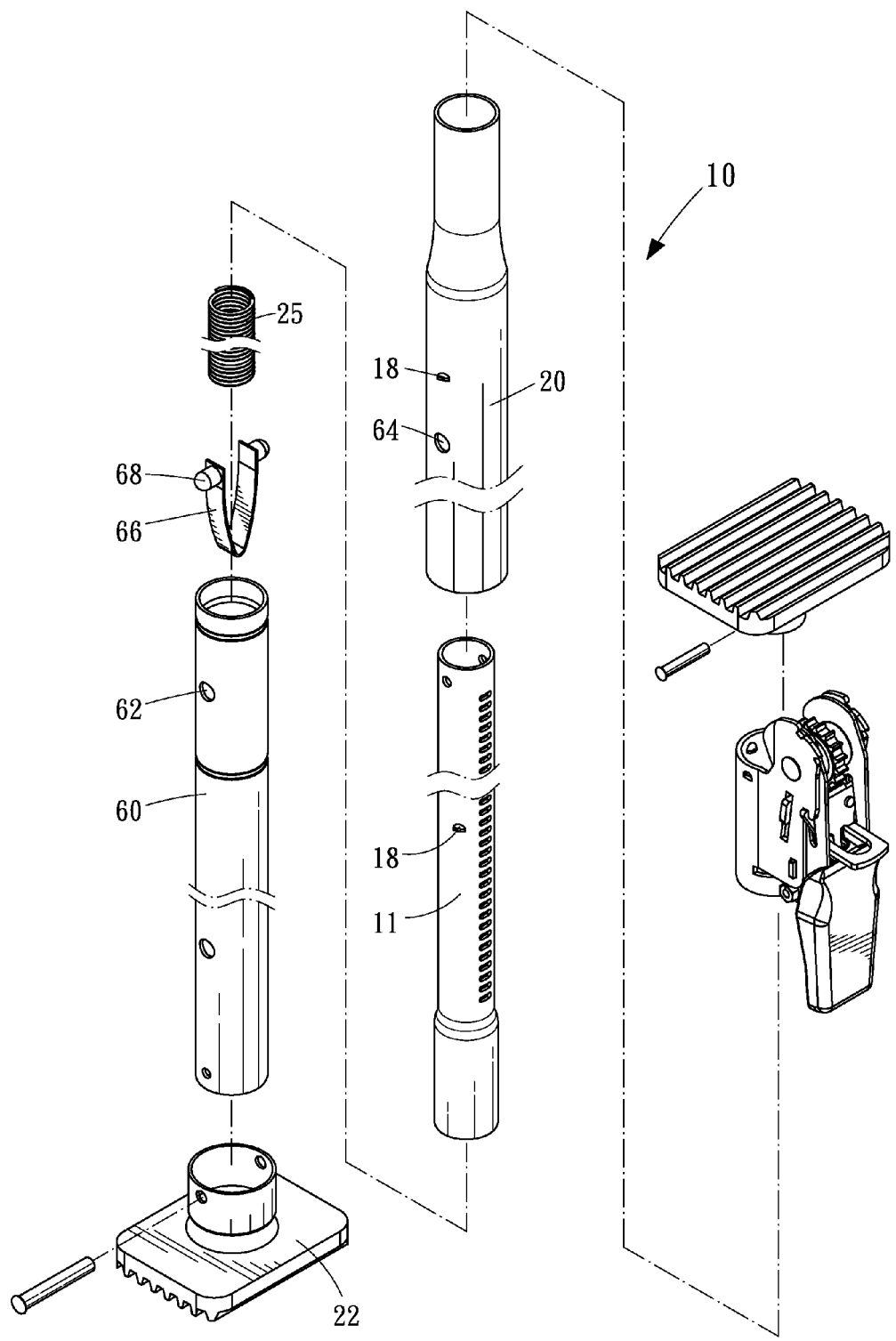
FIG. 6 is an exploded view of an automatically extensible telescopic apparatus according to the second embodiment of the present invention.

Referring to FIG. 6, there is shown an automatically extensible telescopic apparatus according to a second embodiment of the present invention. The second embodiment is identical to the first embodiment except including a third tube 60. The second tube 20 is inserted in the third tube 60. The second tube 20 includes a pair of apertures 64 defined therein. The third tube 60 includes several pairs of apertures 62 defined therein. An elastic lock that includes two bosses 68 extending from two ends of a V-shaped leaf spring 66 is placed in the second tube 20. By the V-shaped leaf spring 66, the pair of bosses 68 is kept in the pair of apertures 64 of the second tube 20. The pair of bosses 68 can be moved out of any pair of apertures 62 of the third tube 60 so that the second tube 20 can be extended from or inserted into the third tube 60. The pair of bosses 68 can be inserted in a selected pair of apertures 62 of the third tube 60 to keep the combination of the second tube 20 with the third tube 60 at a desired length.

Figure 7:
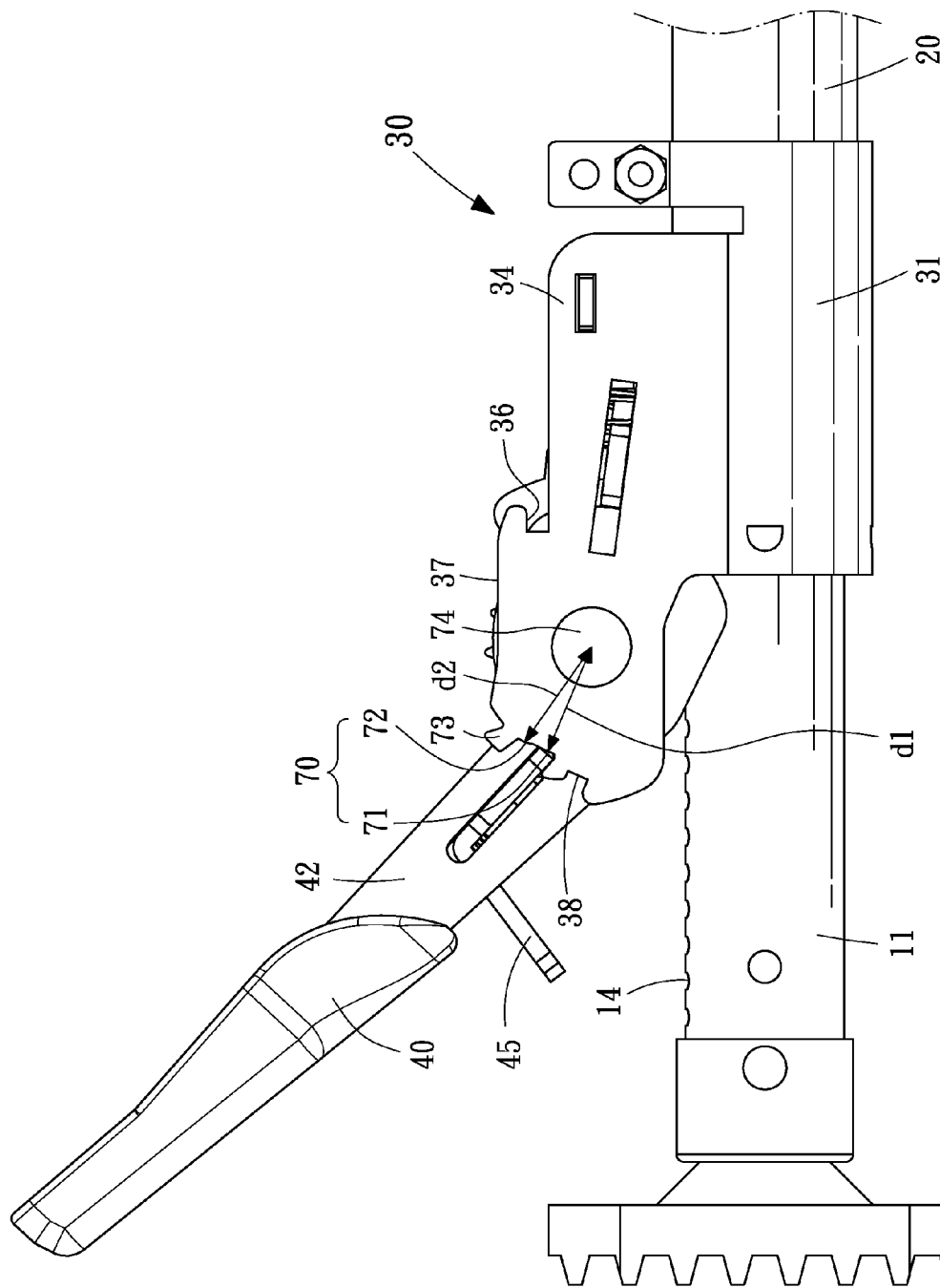
FIG. 7 is a side view of an automatically extensible telescopic apparatus according to the third embodiment of the present invention.
Figure 8:
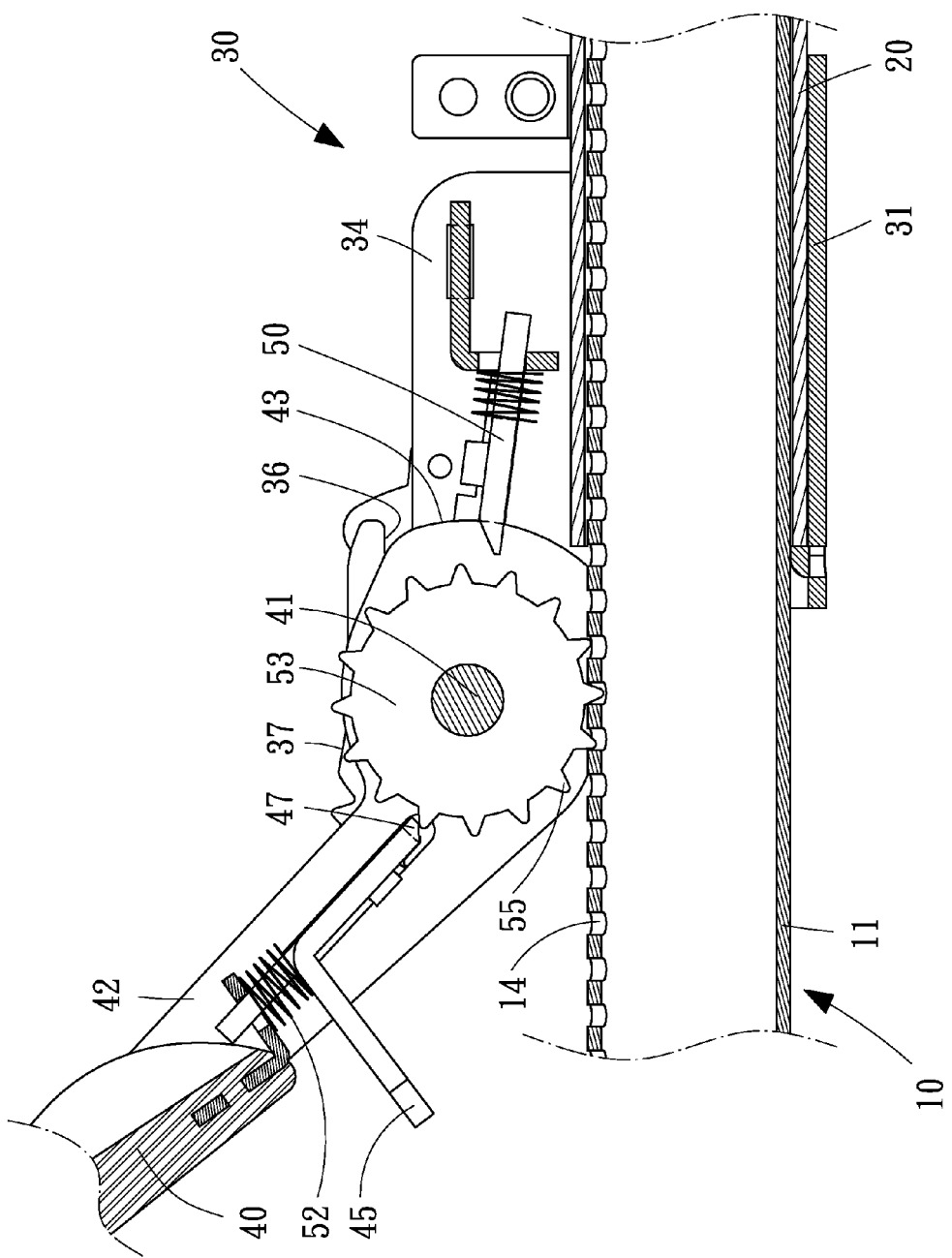
FIG. 8 is a cross-sectional view of the automatically extensible telescopic apparatus shown in FIG. 7.
Figure 9:
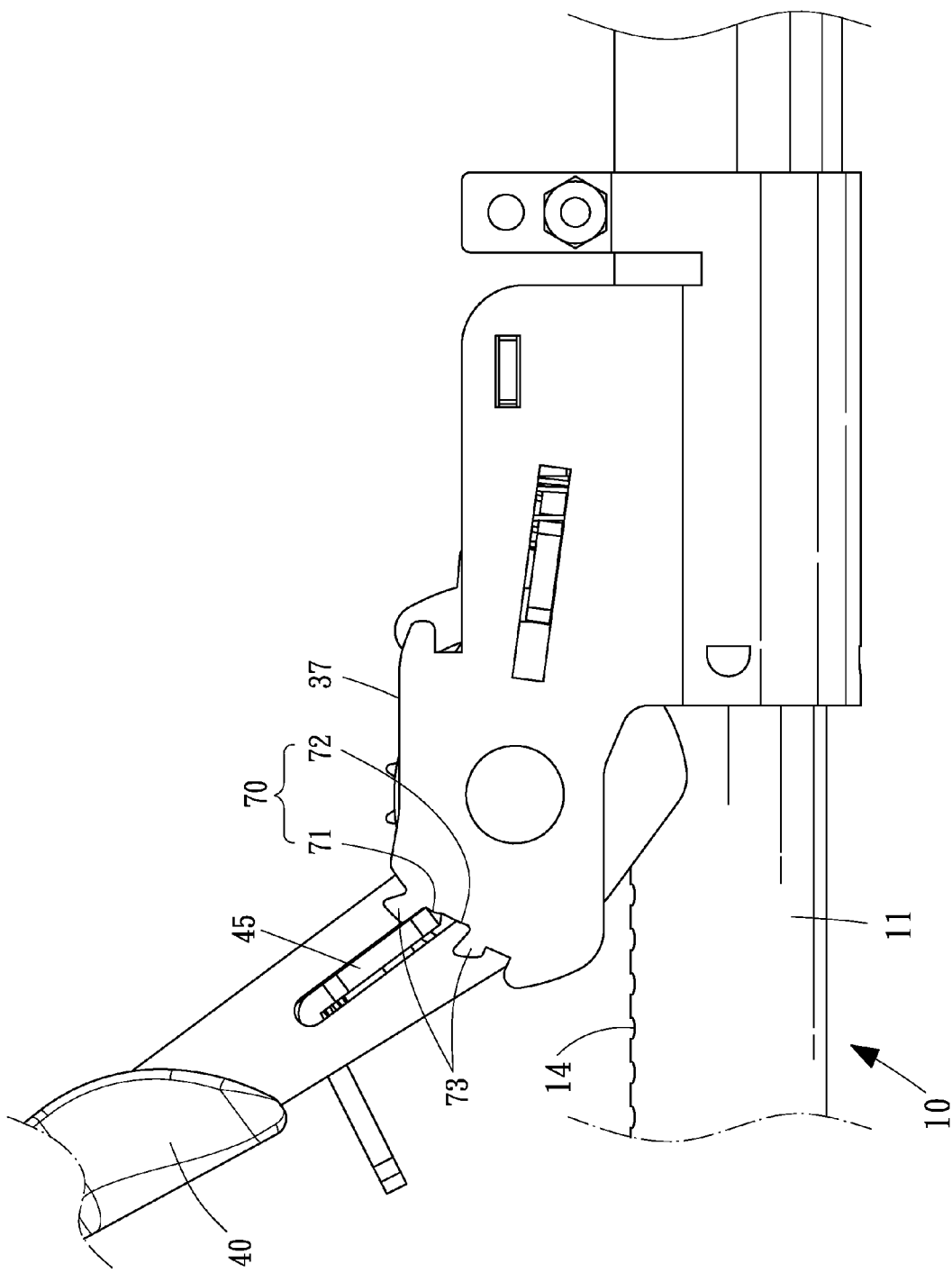
FIG. 9 is a side view of the automatically extensible telescopic apparatus in another position than shown in FIG. 7.

Referring to FIGS. 7 through 9, there is shown an automatically extensible telescopic apparatus according to a third embodiment of the present invention. The third embodiment is identical to the first second embodiment except that the edge of each fin 34 includes an additional segment 70 defined by two lugs 73 formed between the segments 37 and 38. One of the lugs 73 is placed near the segment 38 while the other lug 73 is placed near the segment 37. The segment 70 includes an end 71 by the lug 73 near the segment 38 and another end 72 by the lug 73 near the segment 37. The distance d1 of the end 71 from an axis 74 of the shaft 41 is shorter than the distance d2 of the end 72 from the axis 74.

The automatically extensible telescopic apparatus is in a semi-automatic mode as each wing of the detent 45 is placed on the segment 70 of the edge of the respective fin 34. Details of the semi-automatic mode will be given.

Referring to FIG. 7, each wing of the detent 45 is placed at the end 71 of the segment 70 of the edge of the respective fin 34. Referring to FIG. 8, the detent 50 is disengaged from the toothed wheel 53 by the cams 43. The detent 45 is engaged with the toothed wheel 53. Thus, the detent 45 stops the toothed wheel 53 from rotation and hence stops the first tube 11 from extension from the second tube 20.

Figure 10:
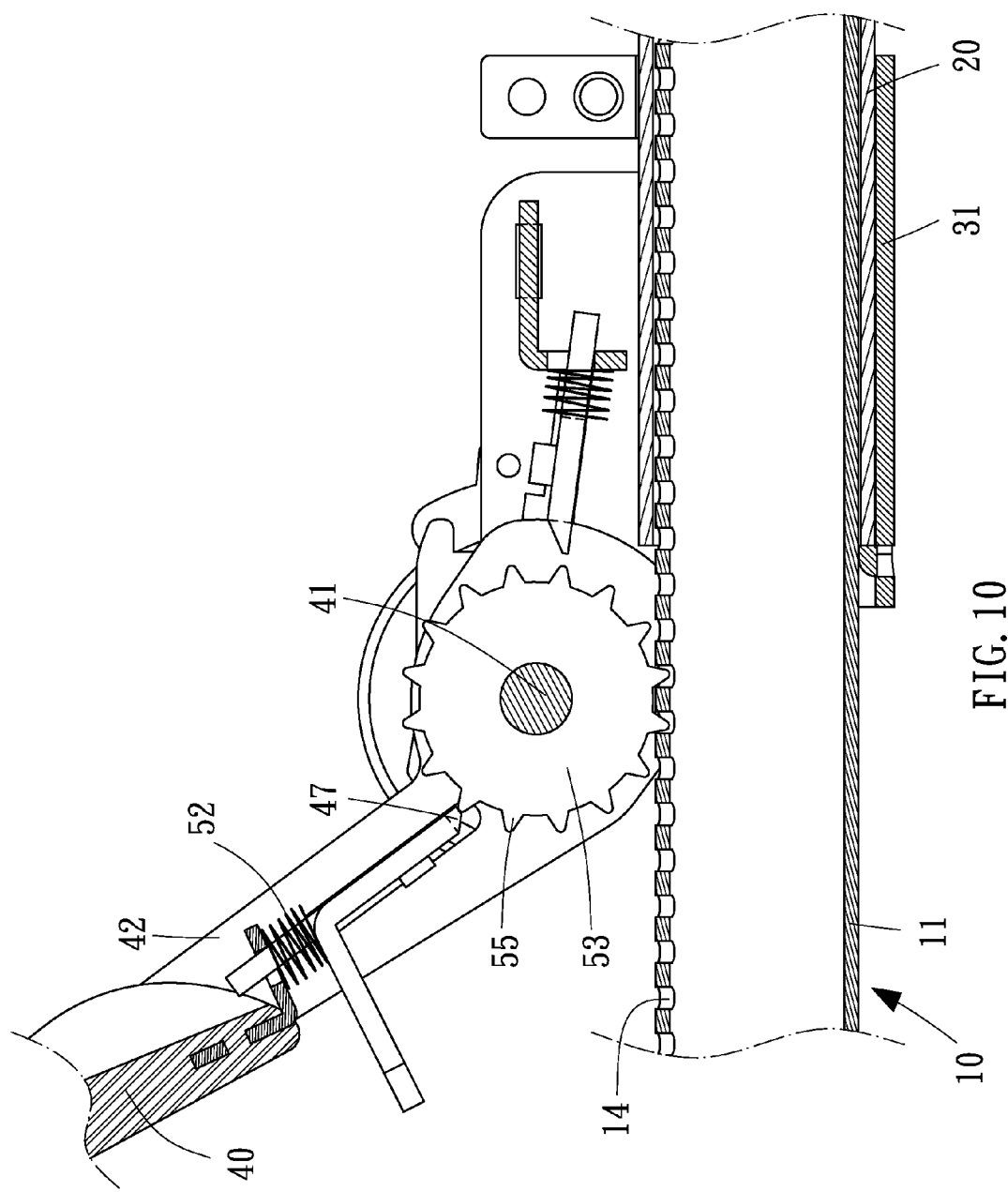
FIG. 10 is a cross-sectional view of the automatically extensible telescopic apparatus in another position than shown in FIG. 9.

Referring to FIG. 9, each wing of the detent 45 is placed at the end 72 of the segment 70 of the edge of the respective fin 34. Referring to FIG. 10, the detent 50 is disengaged from the toothed wheel 53 by the cams 43. The detent 45 is also disengaged from the toothed wheel 53. Thus, the automatic rotation of the toothed wheel 53 is allowed and so is the extension of the first tube 11 from the second tube 20.

The spring 52 tends to bring the detent 45 to the first end 71 from the second end 72 since the distance d1 is shorter than the distance d2. Hence, a user may pivot the handle 40 to bring the detent 45 to the second end 72 from the first end 71 to allow the automatic extension of the first tube 11 from the second tube 20. The user may release the handle 40 to allow the spring 52 to return the detent 45 to the first end 71 from the second end 72 to stop the automatic extension of the first tube 11 from the second tube 20. This is why the automatically extensible telescopic apparatus is said to be in the semi-automatic mode as each wing of the detent 45 is placed on the segment 70 of the edge of the respective fin 34.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. An automatically extensible telescopic apparatus including:
   a first tube including recesses defined therein, a slender section, a wide section and a transient section extending from the slender section to the wide section;
   a second tube for containing the first tube, wherein the second tube includes a slender section, a wide section and a transient section extending from the thin section to the wide section thereof, wherein the transient section of the first tube can be placed against the transient section of the second tube to keep the first tube partially in the second tube;
   a positioning unit including:
      a ferrule provided on the second tube;
      two fins formed on the ferrule;
      a shaft rotationally supported on the fins and formed with an axis;
      a toothed wheel supported on the shaft and formed with teeth for insertion in the recesses; and
      a first detent movably supported on the fins for engagement with the toothed wheel;
   a handle including:
      two blades placed between the fins and supported on the shaft; and
      a second detent movably supported on the blades for engagement with the toothed wheel; and
   an elastic element compressed between a portion of the first tube and a portion of the second tube for extending the first tube from the second tube.

2. The automatically extensible telescopic apparatus according to claim 1, wherein the slender section of the first tube can be extended from the slender section of the second tube while the wide and transient sections of the first tube are placed in the wide and transient sections of the second tube.

3. The automatically extensible telescopic apparatus according to claim 1, wherein the elastic element is a spring placed in the first tube.

4. The automatically extensible telescopic apparatus according to claim 3, wherein the first tube includes at least one boss formed on an internal side, wherein an end of the elastic element is placed against the boss.

5. The automatically extensible telescopic apparatus according to claim 4, further including a pin inserted through the second tuber, wherein another end of the elastic element is placed against the pin.

6. The automatically extensible telescopic apparatus according to claim 4, wherein the second tube includes at least one boss formed on an internal side, wherein another end of the elastic element is placed against the boss of the second tube.

7. The automatically extensible telescopic apparatus according to claim 1, further including a third tube for receiving the second tube.

8. The automatically extensible telescopic apparatus according to claim 7, further including an elastic lock formed with a leaf spring and a boss extending from the leaf spring, wherein the second tube includes an aperture defined therein, wherein the third tube includes several apertures defined therein, wherein the leaf spring is placed in the second tube while the boss can be inserted in a selected one of the apertures of the third tube via the aperture of the second tube.

9. The automatically extensible telescopic apparatus according to claim 1, wherein each of the fins includes an edge formed with a segment formed with a first end and a second end, wherein a distance of the first end from the axis is shorter than a distance of the second end from the axis, wherein the toothed wheel cannot be rotated and the first and second tubes cannot be moved relative to each other when the second detent is placed at the first end, wherein the toothed wheel can be rotated and the first and second tubes can be moved relative to each other when the second detent is placed at the second end.

10. The automatically extensible telescopic apparatus according to claim 9, the edge of each of the fins is formed with first and second lugs, wherein the first end is placed by the first lug, wherein the second end is placed by the second lug.

* * * * *